United States Patent [19]

Wells et al.

[11] 4,424,585
[45] Jan. 3, 1984

[54] CHEMICAL LASER NOZZLE BLADE SUPPORT SYSTEM

[75] Inventors: Jimmie D. Wells, Northridge, Calif.; Robert E. DeLand, Fredericktown, Mo.

[73] Assignee: The United States of America as represented by the Secretary of the Air Force, Washington, D.C.

[21] Appl. No.: 322,042

[22] Filed: Nov. 16, 1981

[51] Int. Cl.³ .......................................... H01B 3/095
[52] U.S. Cl. ..................................... 372/89; 372/58; 372/701; 29/157 C; 239/553.5
[58] Field of Search .................... 372/89, 104, 90, 58, 372/55, 34; 239/555, 551, 553.5; 330/4.3; 415/83; 29/157 C

[56] References Cited

U.S. PATENT DOCUMENTS 4,187,595 2/1980 Kuhn, Jr. .......................... 29/157
4,220,933 9/1980 Kuhn, Jr. .......................... 331/94.5

*Primary Examiner*—William L. Sikes
*Assistant Examiner*—Leon Scott, Jr.
*Attorney, Agent, or Firm*—Donald J. Singer; Jacob N. Erlich

[57] ABSTRACT

A chemical laser nozzle blade support system which incorporates therein at least two continuous flexure member to secure the nozzle blades of the laser to the laser body. The blade and flexure member are formed with a radius, R, and each side of the member is supported by a surface having a radius, $R_1$. Under nonstress conditions the blade and member are subjected to the same pressure and have the same radius of curvature. During operation of the laser, axial deflections occur which cause the blade end of the member to deflect in a radial manner which induces bending in the member. The magnitude of the bending stress is limited by establishing the value of $R_1$ such that the change in radius of curvature cannot exceed a desired value. The resulting blade load is therefore primarily in tension with the only bending being that induced by the structural deflection.

4 Claims, 2 Drawing Figures

CHEMICAL LASER NOZZLE BLADE SUPPORT SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to chemical lasers, and, more particularly to a nozzle blade support system for use within a chemical laser.

The development of the laser has created a new area of technology which finds application in many systems already in existence today. For example, lasers can be found in the area of optical communications, holography, medicine, cutting, calculating and in radar. The utilization of the laser in such areas is in many instances dependent upon the amplification of the existing laser radiation.

In certain areas, such as optical communications or optical radar, it is necessary to greatly amplify the initial radiation power produced by the laser. One laser which produces a high output power is the chemical laser. In such a laser, or in most conventional lasers, the "optical or resonant cavity" of the laser typically comprises plane parallel or curved mirrors located perpendicular to the axis of the region containing the laser medium. This region may be in for of a gas envelope or the like in which the lasing action takes place. For laser operation, one of the mirrors is required to be partially transmissive in order to extract a useful beam of coherent electromagnetic radiation from the resonant cavity.

Although such chemical lasers are extremely desirable, they are also highly complex systems that, while requiring extreme precision for operation, also generate high heat and internal pressures. This heat and pressure is generally sufficient to distort the component parts thereof. Therefore, the design of such lasers must reflect the potential physical extremes to which the parts are subjected. One of the parts, the cavity injector nozzle blade, is especially sensitive to pressure loading. A severe problem therefore arises in the construction of such nozzle blades. In order to more extensively utilize chemical lasers of the type described above, it is essential that a nozzle blade support system be developed which is able to reliably operate within the chemical laser resonant cavity and thereby alleviate the problems normally associated with the extreme heat and pressure to which these nozzle blades are subjected.

SUMMARY OF THE INVENTION

The instant invention overcomes the problems encountered in the past and as set forth in detail hereinabove by providing a cavity injector nozzle blade support system which is capable of withstanding the load the nozzle blades are normally subjected to. This is accomplished by utilizing within the nozzle blade support system a continuous membrane for attaching each end of the blade to a uniquely designed support.

The present invention is primarily utilized in chemical lasers in which the nozzle blade forms a portion of the optical or resonant cavity. In this invention the blades are supported by membranes extending from both ends of the blade to a rigid support. In this manner the blades are designed to carry the combustion pressure load generated within the combustor primarily by hoop tension. More specifically, under normal conditions or in the absence of thermal and mechanical deflections the membrane has the same radius of curvature as the blade and is subjected to the same pressure. As a result this blade undergoes pure hoop tension. However, since these deflections do exist, under operating conditions, the blades will move radially and the membranes will comply with the movement by bending. Bending in the membrane is concentrated at the ends thereof. To limit the stress resulting from bending, a contacting surface is provided for the membrane with a radius that will limit the radius of curvature of the membrane. By controlling this radius, the bending stress within the blade can be limited to a desired acceptable value.

It is therefore an object of this invention to provide a novel nozzle blade support system for a chemical laser.

It is another object of this invention to provide a chemical laser nozzle blade support system which is capable of operating reliably under extreme heat and pressure conditions generated internally of the laser combustor.

It is further object of this invention to provide a chemical laser nozzle blade support system which is economical to produce and which utilizes conventional, currently available components for the manufacture thereof.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

Figure 1:
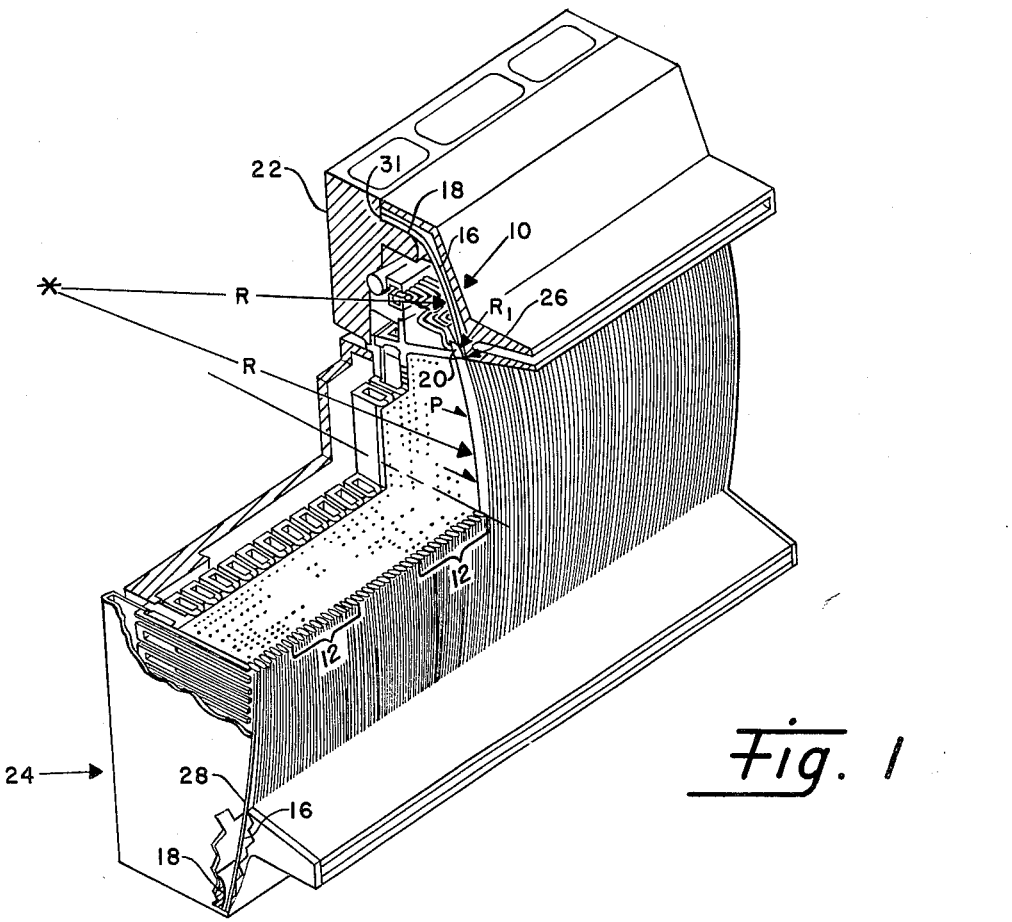
Figure 2:
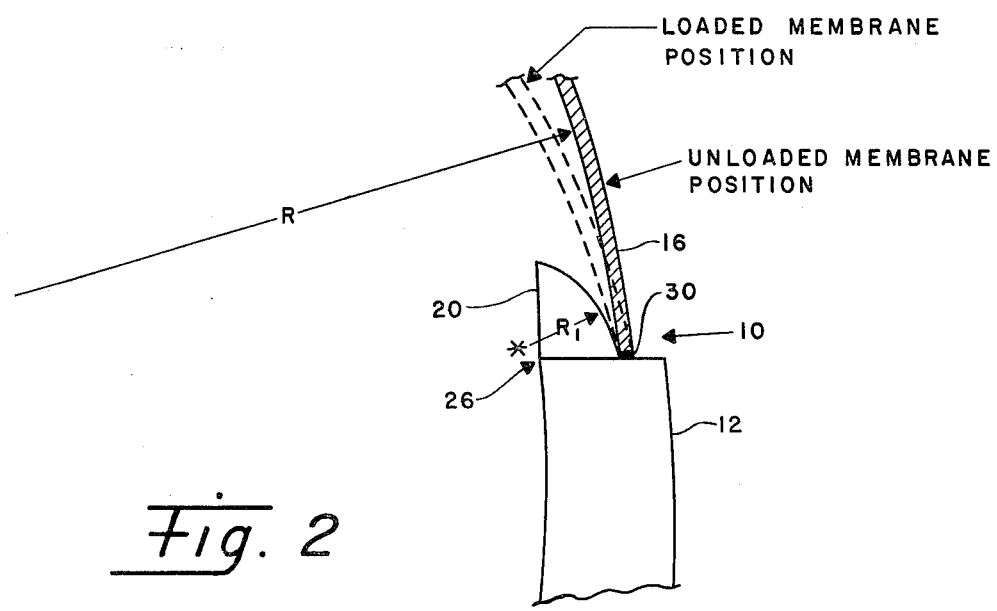

FIG. 1 is a pictorial representation, shown partly in cross section, of the nozzle blade support system of this invention; and FIG. 2 is a side elevational view, shown partly in cross-section, of the relationship (in the loaded and unloaded position) between the membrane and one end of a blade of the nozzle blade support system of this invention.

DETAILED DESCRIPTION OF THE PREFERRED EMBODIMENT

Reference is now made to FIG. 1 of the drawing which pictorially illustrates the nozzle blade support system 10 of this invention. Nozzle blade support system 10 is made up of a plurality of blades 12, a pair of flexure members 16 for supporting each end of blades 12 and uniquely designed rigid supports 18 and 20 for supporting each of the flexure members between the laser housing 22 and blade 12, respectively. The nozzle blade support system 10 of this invention including blades 12 are incorporated within a conventional nozzle blade assembly 24 of a conventional chemical laser (not shown).

For purposes of ease of undertanding of this invention, the following detailed description of the invention will be made with respect to only one end 26 of blade 12 and the membrane 16 associated therewith. It should, however, be realized that the other end of blade 12 and its associated membrane 16 is supported in a similar manner. Therefore, all elements which are identical to those elements described and illustrated with respect to the one end 26 of blade 12 will be designated by similar numerals in the drawing.

Reference is now made to both FIGS. 1 and 2 of the drawing. In a conventional chemical laser operation, the laser itself generates extremely high temperatures and pressures internally of the combustor and which under normal circumstances are sufficient to distort the component parts of a conventional blade assembly. Under ordinary circumstances, the blades cannot support all the pressure loads by beam action.

This invention overcomes the above-mentioned problem by allowing blades 12 to carry the load essentially by hoop tension. This is accomplished by having blades 12 follow a preselected radius of curvature. In addition, each end 26 and 28 of blades 12 are affixed to laser housing 22 adjacent supports 18 and 20 by continuous membrane 16.

Blade 12 and membrane 16 are formed with a preselected radius, R. As shown in FIG. 2 of the drawing at the point 30 at which the membrane 16 is affixed to blade 12 by any conventional securing procedure such as brazing or welding, rigid support 20 is either affixed to each blade 12 or formed as an integral part thereof. This support 20 is formed with a preselected radius of curvature, $R_1$. Likewise, at the point 31 at which membrane 16 is affixed to housing 22 a similar rigid support 18, having radius of curvature, $R_1$, is affixed to or formed as an integral part of housing 22.

Under normal operation conditions membrane 16 and blade 12 are subjected to the same pressure, P. Since both blades 12 and membrane 16 have the same radius, R, under the no thermal stress condition, a nominal tensile load of PxR results in each. During continued laser operation, axial deflections result from this mechanical load and also from expansion due to temperature. These deflections cause ends 26 and 28 of blades 12 to deflect in a radial manner which induces bending of membrane 16. This bending is concentrated at the edges of membrane 16 as illustrated by the dotted lines of FIG. 2 of the drawing. The magnitude of the bending stress is limited by establishing the value of $R_1$ such that a change in radius of curvature can not exceed a preselected desired value. The resultint blade load is therefore primarily in tension and the only bending that is induced is by the structural deflection. In other words, the radius, $R_1$ limits strain on membrane 16 and therefore allows the nozzle blade 12 to act as a hoop member.

In order to establish the appropriate radius of curvature of supports 18 and 20, it is first necessary to establish that at the point of contact between the support 18 and the membrane 16 as well as between support 20 and membrane 16 (illustrated in FIG. 2) the radius $R_1$ of the support is such that it defines a tangent to membrane 16 in its non-loaded condition. The center for radius $R_1$ is selected such that it lies along a line drawn through this tangent point.

More specifically, the relationship between radius $R_1$ and the radius R is defined by the following equation:

$$R_1 = t/2(\epsilon + (t/2R)(1+\epsilon))$$

where t = the thickness of membrane 16;
R = the radius of curvature of membrane 16 and blade 12 in the unloaded or unstressed condition; and
$\epsilon$ = the membrane strain due to bending at radius $R_1$ which also equals the design allowable bending strain of membrane 16.

It is therefore readily apparent that the radius $R_1$ limits how much the membrane 16 curves under laser operating conditions. The stress that can be developed in membrane 16 depends upon the material and temperature properties of the membrane. A preferable material which can be utilized for membrane 16 would be a nickel alloy. By controlling radius, $R_1$, the bending strain can be limited to any desired value.

Although this invention has been described in reference to a particular embodiment, it will be understood that this invention is also capable of further and other embodiments within the spirit and scope of the appended claims.

In the claims:

1. In a chemical laser having a body and a plurality of nozzle blades, the improvement therein being in the form of a nozzle blade support system, said nozzle blade support system comprising a flexure member, wherein said flexure member has a preselected thickness, $t_1$ and the relationship between a first predetermined radius of curvature, R, and a second predetermined radius of curvature, $R_1$, is defined by the expression $R_1 = t/2 (\epsilon + (t/2R) (1+\epsilon))$ wherein $\epsilon$ represents the strain of said member due to bending at said radius, $R_1$, said flexure member being fixedly secured at one end thereof to one end of at least one of said plurality of nozzle blades and being secured at the other end thereof to said laser body, first means on at least said one nozzle blade adjacent said flexure member for supporting said one end of said flexure member, second means on said laser body adjacent said flexure member for supporting said other end of said flexure member, said nozzle blade and said flexure member lying along said first predetermined radius of curvature, R, under a substantially no stress condition, said first and said second support means each being defined by said second predetermined radius of curvature, $R_1$, said radius, $R_1$, being substantially less than said radius, R, and means secured between the other end of at least one of said plurality of said nozzle blades and said laser body for supporting said other end of said nozzle blades, whereby upon application of stress to said nozzle blades during laser operation said flexure member bends around said radius of curvature of said first and said second support means and said means for supporting said other end of said nozzle blade bends in such a manner thereby enabling said nozzle blades to act as a hoop member in accommodating said stress applied thereto.

2. In a laser having a body and a plurality of nozzle blades as defined in claim 1 wherein said means for supporting said other end of said nozzle blades comprises another flexure member, the other of said flexure members being fixedly secured at one end thereof to the other end of at least one of said blades, third means on said other end of said blades adjacent said other flexure member for supporting said one end of said other flexure member, the other end of said other flexure member being fixedly secured to said laser body, fourth means on said laser body adjacent said other end of said other flexure member for supporting said other end of said flexure member, and said third and fourth support means each being defined by a radius of curvature, $R_1$.

3. In a laser having a body and a plurality of nozzle blades as defined in claim 2 wherein each of said flexure members are secured to said laser body and to said blades at a position tangent to each of said support means, respectively.

4. In a laser having a body and a plurality of nozzle blades as defined in claim 3 wherein said flexure members are made of a nickel alloy.

* * * * *